United States Patent
Shen et al.

(10) Patent No.: US 9,928,858 B1
(45) Date of Patent: Mar. 27, 2018

(54) MEASUREMENT OF A REVERSED SIDE SHIELD MAGNETIZATION CONDITION

(71) Applicant: Seagate Technology LLC, Cupertino, CA (US)

(72) Inventors: Zhe Shen, Lakeville, MN (US); Zuxuan Lin, Maple Grove, MN (US); Lei Lu, Bloomington, MN (US); Jian Zhong, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/702,571

(22) Filed: Sep. 12, 2017

(51) Int. Cl.
- *G11B 5/31* (2006.01)
- *G11B 19/04* (2006.01)
- *G11B 5/11* (2006.01)
- *G11B 5/127* (2006.01)

(52) U.S. Cl.
CPC .............. *G11B 5/3116* (2013.01); *G11B 5/11* (2013.01); *G11B 5/1278* (2013.01); *G11B 5/315* (2013.01); *G11B 5/3166* (2013.01); *G11B 5/3196* (2013.01); *G11B 19/048* (2013.01)

(58) Field of Classification Search
None
See application file for complete search history.

(56) References Cited

U.S. PATENT DOCUMENTS

| | | | |
|---|---|---|---|
| 8,254,059 B2 | 8/2012 | Horide et al. | |
| 8,570,683 B2 | 10/2013 | Takahashi et al. | |
| 8,824,102 B2 | 9/2014 | Sasaki et al. | |
| 8,873,201 B2 * | 10/2014 | Benakli | G11B 5/11 360/235.4 |
| 9,099,110 B1 | 8/2015 | Chembrolu et al. | |
| 9,123,358 B1 | 9/2015 | Liu et al. | |
| 9,230,566 B1 | 1/2016 | Iwakura et al. | |
| 9,361,923 B1 | 6/2016 | Liu et al. | |
| 9,443,541 B1 | 9/2016 | Liu et al. | |
| 9,478,242 B1 | 10/2016 | Liu et al. | |
| 9,548,079 B2 * | 1/2017 | Sugawara | G11B 20/1217 |
| 9,595,275 B1 * | 3/2017 | Liu | G11B 5/465 |
| 2015/0154991 A1 | 6/2015 | Le et al. | |

OTHER PUBLICATIONS

Liu, Yue et al., "Characterization of Skip or Far Track Erasure in a Side Shield Design"; IEEE Transactions on Magnetics, vol. 45, No. 10, Oct. 2009, 6 pages.

Li, Shaoping et al., "Methods for characterizing magnetic footprints of perpendicular magnetic recording writer heads", Journal of Applied Physics 115, 17B733 (2014), 0021-8979/2014/115(17)/17B733/3/$30.00, (c)2014 AIP Publishing LLC, 3 pages.

* cited by examiner

*Primary Examiner* — Wayne Young
*Assistant Examiner* — James L Habermehl
(74) *Attorney, Agent, or Firm* — Westman, Champlin & Koehler, P.A.

(57) ABSTRACT

A method that includes supplying a predetermined signal to a write head having side shields. The method also includes performing, by the write head, a recording operation on a surface of a data storage medium, when the predetermined signal is supplied to the write head, to provide a recorded magnetization pattern. The method further includes carrying out measurements on a portion of the recorded magnetization pattern influenced by a magnetization of the side shields. The measurements are employed to determine whether a reversed side shield magnetization condition is present in the write head.

20 Claims, 9 Drawing Sheets

MEASUREMENT OF A REVERSED SIDE SHIELD MAGNETIZATION CONDITION

BACKGROUND

Data storage devices use magnetic recording heads to read and/or write data on magnetic storage media, such as a data storage discs. Magnetic recording heads typically include inductive write elements to record data on the storage media. An inductive write element or transducer may include a main pole having a pole tip and one or more return poles. Current is supplied to write coils to induce a flux path in the main pole to record data on one or more magnetic storage layers of the media. Data can be recorded using longitudinal or perpendicular recording techniques. In a perpendicular magnetic recording system, for an example, it is desirable to maximize write field strength and also maximize write field gradient to record more data in smaller spaces. In addition, side track erasure (STE) and adjacent track interference (ATI) should be limited.

SUMMARY

Embodiments of the disclosure relate to methods for measuring a reversed side shield condition (e.g., a condition in which an original or set magnetization direction of the side shields is switched), which may contribute to side track erasure (STE) and adjacent track interference (ATI) in a write head.

In one embodiment, a method is provided. The method includes supplying a predetermined signal to a write head having side shields. The method also includes performing, by the write head, a recording operation on a surface of a data storage medium, when the predetermined signal is supplied to the write head, to provide a recorded magnetization pattern. The method further includes carrying out measurements on a portion of the recorded magnetization pattern influenced by a magnetization of the side shields. The measurements are employed to determine whether a reversed side shield magnetization condition is present in the write head.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of the disclosure relate to methods for measuring a reversed side shield condition (e.g., a condition in which an original or set magnetization direction of the side shields is switched), which may contribute to side track erasure (STE) and adjacent track interference (ATI) in a write head. However, prior to providing additional details regarding the different embodiments, a description of an illustrative operating environment is provided below.

Figure 1A:
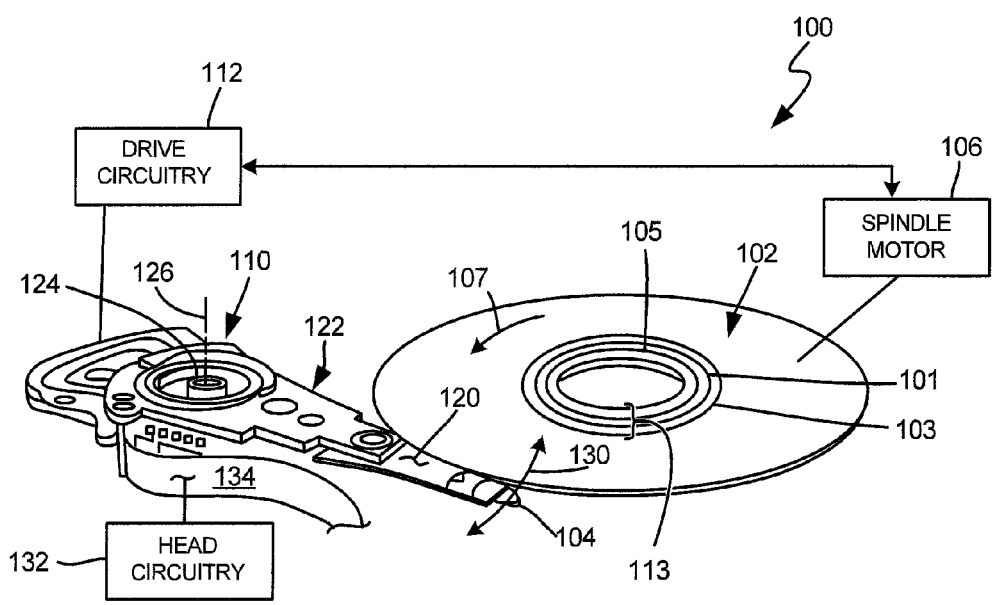
FIG. 1A illustrates an embodiment of a data storage device in which embodiments of the present application can be used.

FIG. 1A shows an illustrative operating environment of a write head in which a reversed side shield condition of the write head may be measured in accordance with embodiments of the disclosure. The operating environment shown in FIG. 1A is for illustration purposes only. Embodiments of the present disclosure are not limited to any particular operating environment such as the operating environment shown in FIG. 1A. Embodiments of the present disclosure are illustratively practiced within any number of different types of operating environments.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1A is a schematic illustration of a data storage device (e.g., a hard disc drive) 100 including a data storage medium and a head for reading data from and/or writing data to the data storage medium. As shown in FIG. 1A, the data storage device 100 includes a data storage medium or disc 102 and a head 104. The head 104 including one or more transducer elements (not shown in FIG. 1A) is positioned above the data storage medium 102 to read data from and/or write data to the data storage medium 102. In the embodiment shown, the data storage medium 102 is a rotatable disc or other magnetic storage medium that includes a magnetic storage layer or layers. For read and write operations, a spindle motor 106 (illustrated schematically) rotates the medium 102 as illustrated by arrow 107 and an actuator mechanism 110 positions the head 104 relative to data tracks (e.g., 101, 103 and 105) on the rotating medium 102. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection.

The one or more transducer elements of the head 104 are coupled to head circuitry 132 through flex circuit 134 to encode and/or decode data. Although FIG. 1A illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 1B:
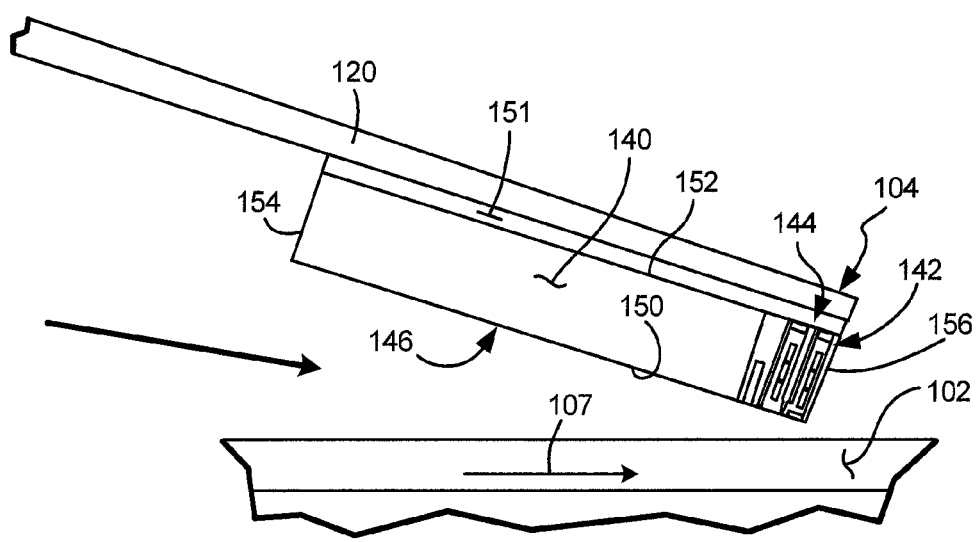
FIG. 1B is a schematic illustration of a head including one or more transducer elements above a magnetic recording medium.

FIG. 1B is a detailed illustration (side view) of the head 104 above the medium 102. The one or more transducer elements on the head 104 are fabricated on a slider 140 to form a transducer portion 142 of the head 104. The transducer portion 142 shown includes write elements encapsulated in an insulating structure to form a write assembly 144 of the head. As shown, the head 104 includes a bearing surface (for example, an air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air flow in direction 107 as shown in FIG. 1B along the air bearing surface 146 of the slider 140 from a leading edge 154 to the trailing edge 156 of the slider 140 or head 104. Air flow along the air bearing surface 146 creates a pressure profile to support the head 104 and slider 140 above the medium 102 for read and/or write operations. As shown, the transducer portion 142 is formed at or near the trailing edge 156 of the slider 140. A transducer/head portion in accordance with one embodiment is described below in connection with FIGS. 2A and 2B.

Figure 2A:
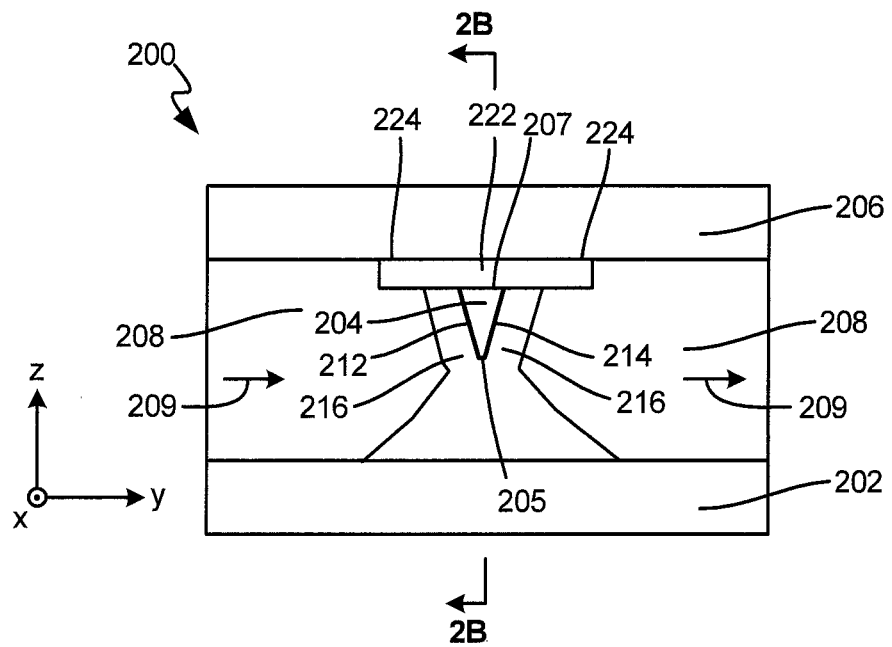
FIG. 2A depicts a bearing surface view of a perpendicular magnetic recording (PMR) transducer in accordance with one embodiment.
Figure 2B:
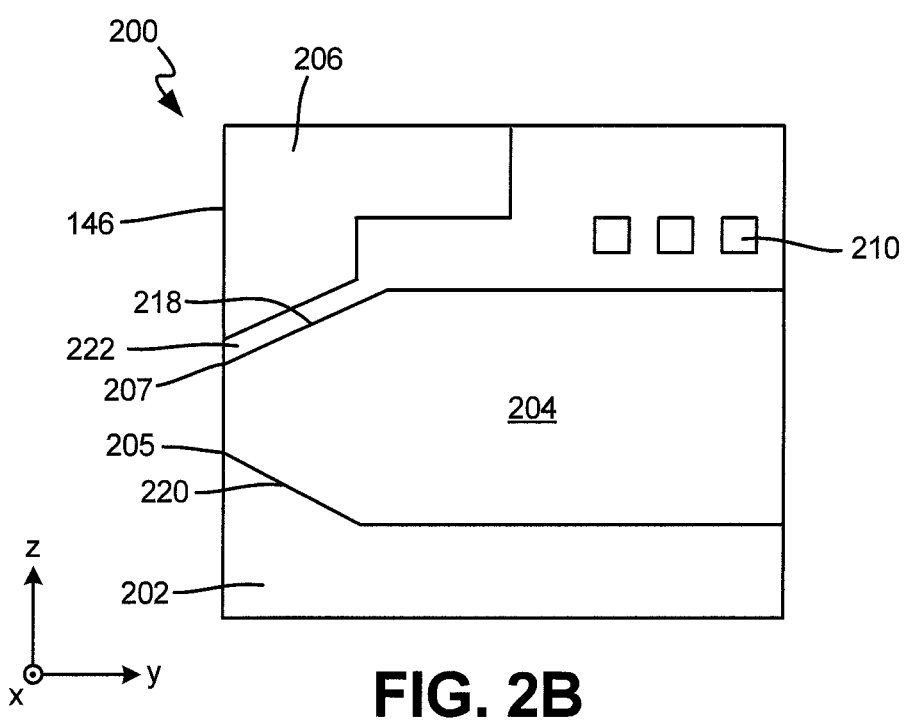
FIG. 2B depicts a side view of the PMR transducer of FIG. 2A.

FIGS. 2A and 2B depict ABS and side views, respectively, of a perpendicular magnetic recording (PMR) transducer 200. The PMR transducer 200 may be a part of a merged head including the write transducer 200 and a read transducer (not shown). Alternatively, the magnetic recording head may be a write head only including the write transducer 200. The PMR transducer elements shown in FIGS. 2A and 2B are illustratively included in a recording head such as recording head 104 of FIGS. 1A and 1B.

The write transducer 200 includes an under-layer/substrate 202, a main pole 204, a trailing shield 206 and side shields 208. The under-layer 202 may include multiple structures which are under the pole 204. The write transducer 200 may also include other components including but not limited to coils (denoted by reference numeral 210 in FIG. 2B) for energizing the main pole 204.

The main pole 204 resides over under-layer 202 and includes sidewalls 212 and 214. Sidewalls 212 and 214 are separated from the side shields 208 by non-magnetic side shield gaps (SSGs) 216. The top (trailing) surface of the main pole 204 may have a beveled portion 218. The bottom (leading) surface of the main pole 204 may also include a leading surface bevel 220. At the bearing surface, the leading surface of the main pole 204 has a leading edge 205 and a trailing edge 207, which are connected by side edges of sidewalls 212 and 214. A trailing shield gap (TSG) 222 is formed between the trailing shield 206 and the main pole 204. In write head/transducer 200, the TSG 222 extends over or outside the SSGs 216 in a cross-track direction, forming overhangs 224 that separate the trailing shield 206 from portions of the side shields 208. In FIG. 2A, an original or set magnetization direction of side shields 208 is shown by arrows 209. A recording head such as 200 may have certain on-track performance advantages, but may also produce STE and ATI.

Figure 2C:
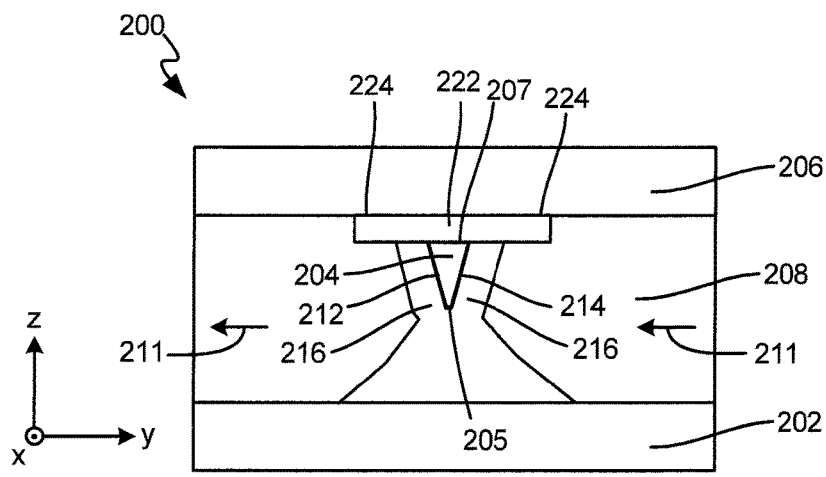
FIG. 2C is a bearing surface view if a PMR transducer under a reversed side shield condition.

In general, ATI and STE refer to the partial erasure of neighboring tracks on either side of a particular track after repeated write operations on the particular track. For example, referring back to FIG. 1A, track 101 may be the particular track and tracks 103 and 105 may be the neighboring tracks on either side of track 101. ATI and STE are caused by stray fields produced by magnetic charges on different parts of the write head. Stray flux leaking from other regions of an integrated read/write head (e.g., shields) can also produce significant erasure phenomena, especially in perpendicular recording systems. ATI/STE has become a serious issue in recent generations of products, considerably limiting the design space of the heads and media. It is difficult to eliminate ATI/STE completely, as writer designs that optimize a write field magnitude often do so at the expense of considerable fringing side fields. A successful design may be a compromise between increasing the write performance and limiting ATI/STE. Recent studies have shown that ATI/STE is much stronger when a magnetization of the side shield is reversed. FIG. 2C illustrates write head 200 under a reversed side shield condition where the original or set magnetization direction 209 of the side shields 208 is reversed as shown by arrows 211.

Figure 3:
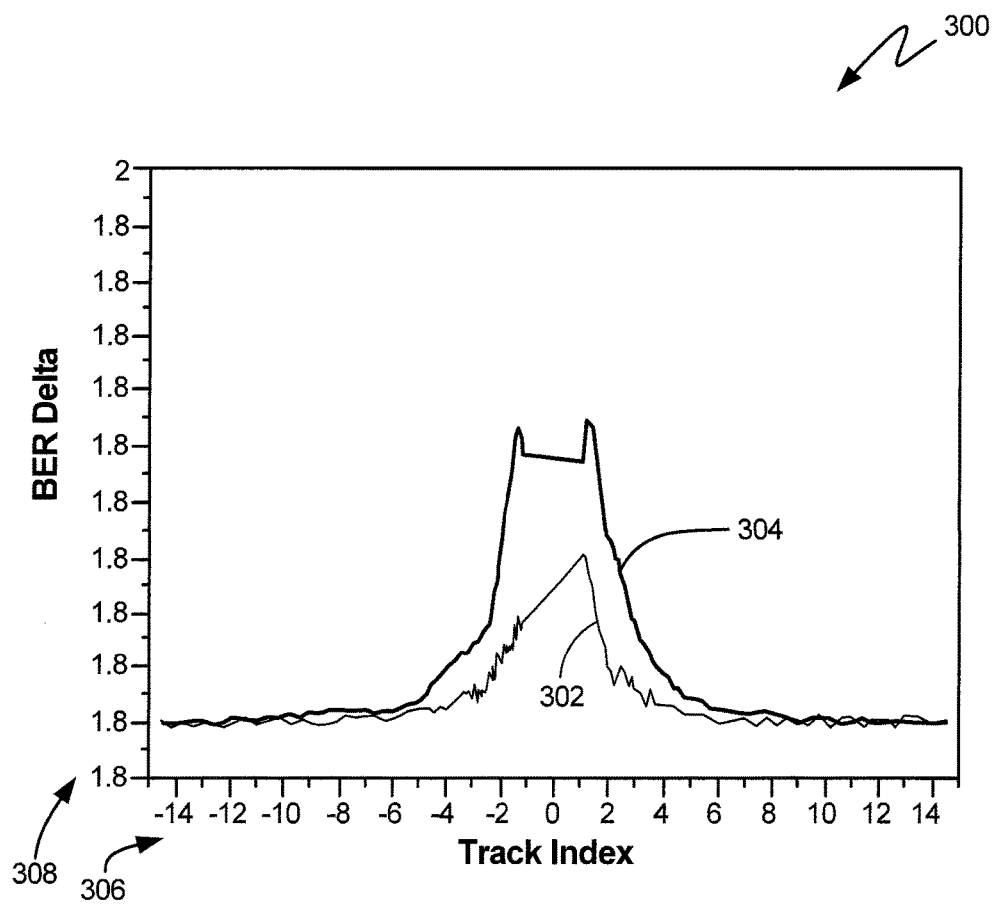
FIG. 3 is a graph that includes plots that compare adjacent track interference (ATI)/side track erasure (STE) obtained from write operations with write heads with and without a reversed side shield condition.

FIG. 3 is a graph 300 that includes plots that compare ATI/STE obtained from write operations with write heads with and without a reversed side shield condition. Plot 302 is for a group of write heads without the reversed side shield condition (e.g., write heads with side shields magnetized in an original or set direction). Plot 304 is for a group of write heads under the reversed side shield condition (e.g., write heads in which the original or set magnetization direction of the side shields are switched). In FIG. 3, horizontal axis 306 represents track number and vertical axis 308 represents changes in bit error rate (BER Delta) due to ATI/STE relative to a baseline or nominal BER (e.g., a BER value without ATI/STE). Track 0 is the track on which the write operation with the write head takes place, and the track numbers on either side of track 0 denote tracks on either side of track 0. In FIG. 3, BER Delta values on vertical axis 308 indicate severity levels of BER loss. As can be seen in FIG. 3, ATI/STE is substantially stronger for the write head under the reversed side shield condition (plot 304) compared to plot 302, which, as indicated above, is for the write head without the reversed side shield condition.

A root cause of the reversed side shield condition is not fully understood yet, but it may be related to a low side shield energy barrier. The low side shield energy barrier may be partly from the write head manufacturing process and partly from the write head design. The reversal in the direction of the side shield magnetization may take place during the writing process. Magnetic Force Microscopy (MFM) and footprint methods have been used to review side shield magnetization orientation. Both MFM and footprint methods are time consuming and not especially effective. Therefore, there is a need for quantitatively measuring a reversed side shield condition in a fast and accurate manner, which will help provide volume data to understand the mechanism of the reversed side shield, and will provide a tool to screen out the reversed side shield heads for production of hard disc drives, to thereby increase drive yield.

Figure 4:
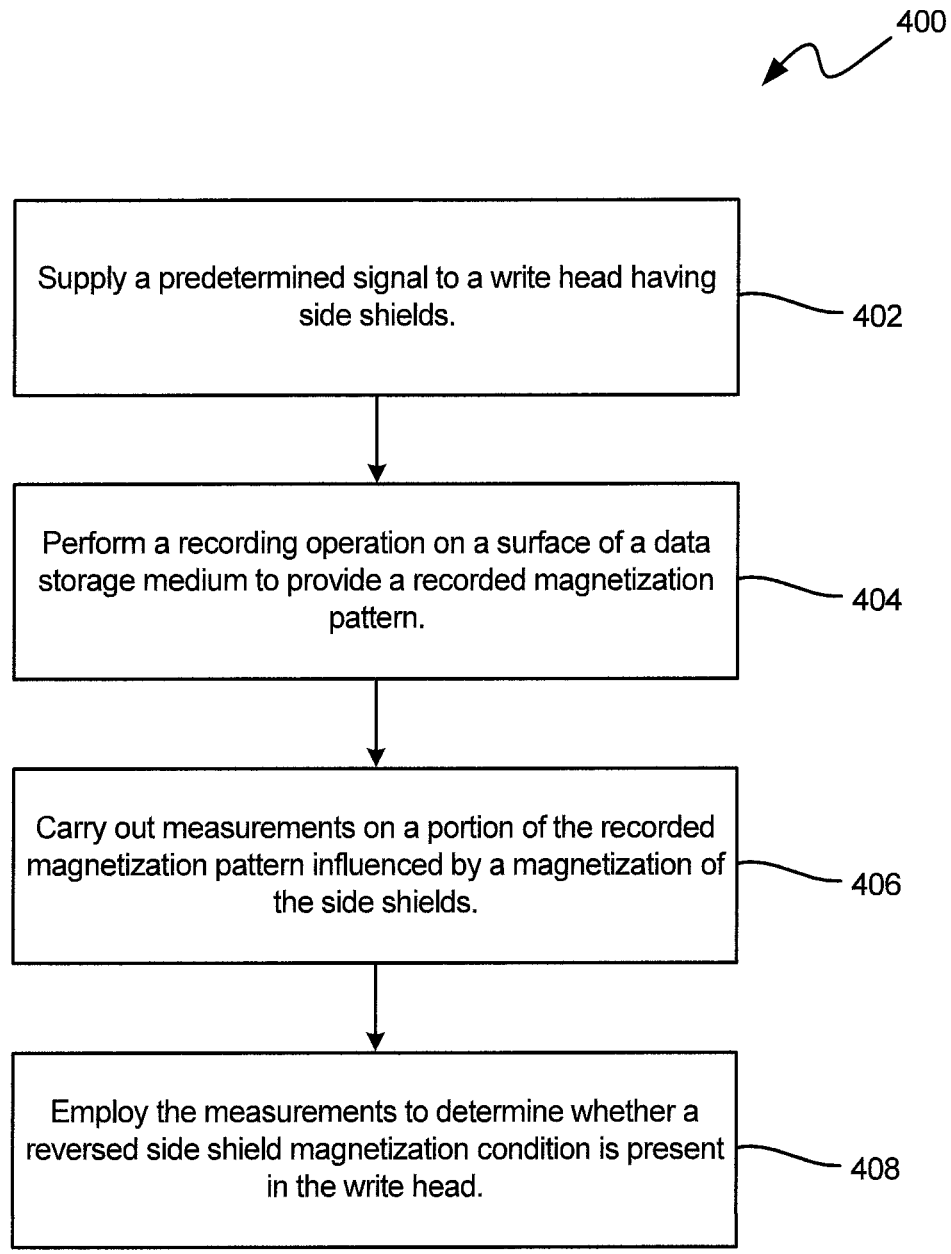
FIG. 4 is a flow diagram of a method embodiment.

FIG. 4 is a flow diagram 400 of a method determining a reversed side shield condition in accordance with an embodiment of the disclosure. At step 402, a predetermined signal is supplied by a controller to a write head having side shields. The controller may be, for example, drive circuit 112 of FIG. 1A, which may include integrated circuits. At step 404, when the predetermined signal is supplied to the write head, the write head performs a recording operation on a surface of a data storage medium to provide a recorded magnetization pattern (also referred to herein as a test magnetization pattern). In different embodiments, the recording operation to provide the test magnetization pattern is a single write operation that may be carried out within a single revolution of the data storage disc. Writing once in this manner to provide the test magnetization pattern occurs in a very short duration of time, thereby making such an operation suitable for screening out reversed side shield heads for production. At step 406, measurements are carried out on a portion of the recorded magnetization pattern influenced by a magnetization of the side shields. At step 408, the measurements are employed to determine whether a reversed side shield magnetization condition is present in the write head. For example, if a read operation is carried out on the portion of the recorded magnetization pattern influenced by the magnetization of the side shields, and a measured amplitude of a read signal obtained from the read operation is determined to be above a predetermined threshold, a determination may be made that the write head is under a reversed side shield condition. If the measured amplitude of the read signal is less than or equal to the predetermined threshold, a determination is made that the write head is not under a reversed side shield condition. In general, any suitable measurements may be made to determine whether the write head is under a reversed side shield condition. A detailed example of measuring a reversed side shield condition is described below in connection with FIGS. 5A, 5B and 5C.

Figure 5A:
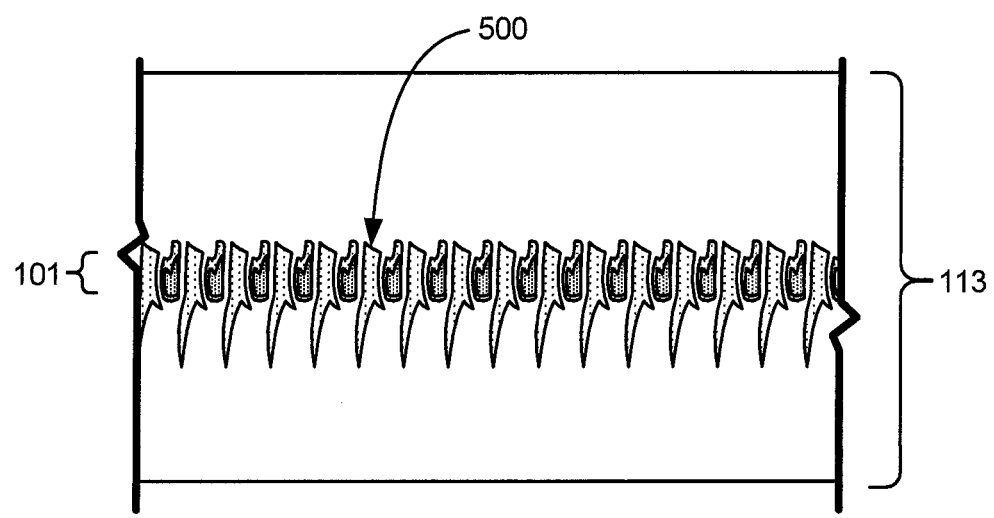
FIGS. 5A, 5B and 5C are diagrammatic illustrations of a portion of a data storage medium illustrating operations carried out to determine a reversed side shield condition in accordance with one embodiment.
Figure 5B:
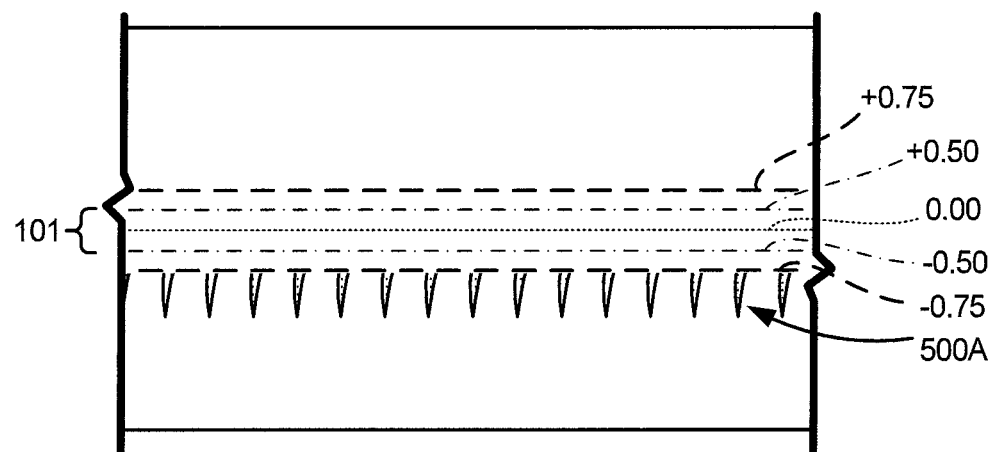
Figure 5C:
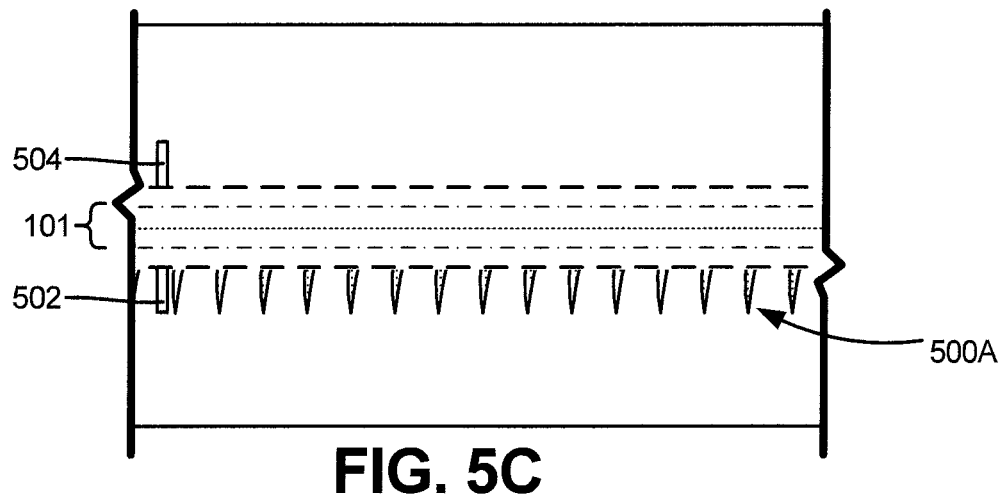

FIGS. 5A, 5B and 5C are diagrammatic illustrations of a portion of a data storage medium illustrating operations carried out to determine a reversed side shield condition in accordance with one embodiment. Prior to carrying out the operations shown in FIGS. 5A, 5B and 5C, a first erase operation may be carried out on a portion 113 of a surface of a data storage medium (e.g., band 113 shown in FIG. 1 may be erased). The first erase operation may be a direct current (DC) erase operation carried out with the help of a controller (e.g., drive circuitry 112 of FIG. 1). In a DC erase operation, a positive or negative DC voltage is applied to a write head by a controller and the resulting field is applied to the data storage medium (e.g., to band 113 of FIG. 1). Since the filed applied to the storage medium is a unidirectional field, the portion of the storage medium to which the field is applied is also magnetized in a single direction, and therefore the DC erase operation leaves the storage medium portion without a magnetization pattern.

After the first DC erase operation is carried out, a write operation is carried out on a track (e.g., on track 101 of FIG. 1) in the DC-erased portion of the data storage medium. As indicated above, the write operation may involve just writing once within a single disc revolution, which makes the test time very short. In one embodiment, the write operation is carried out on the track 101 (over the DC-erased background) with the help of the controller (e.g., drive circuitry 112 of FIG. 1) that provides a single frequency alternating current (AC) signal to the write head which, in turn, generates a field that writes magnetization pattern 500 on the track 101. It should be noted that the single-frequency AC signal is used for the write operation for ease of subsequent analysis. However, in different embodiments, any suitable pattern-recording signals may be used.

Upon completion of the writing of the magnetization pattern 500, a second DC erase operation is carried out on a portion of the magnetization pattern 500 with the help of the controller and the write head. The second DC erase operation is of a width that removes substantially the entire magnetization pattern 500 other than a portion of the pattern 500 that is produced by a magnetization of the side shield. The portion of the pattern 500 produced by the magnetization of the side shield (referred to below as a residual signal) is denoted by reference numeral 500A in FIG. 5B. In FIG. 5B, 0 is a center of track 101 and −0.5 and +0.5 are edges of track 101. The distance between the edges of track 101 is a track width. In a particular embodiment, a width of the second DC erase is about 1.5 times the track width and therefore may extend between −0.75 to +0.75 as shown in FIG. 5B. In other embodiments, the second DC erase width may be 1.4 times the track width, 1.6 times the track width, etc. In general, the second DC erase width may be slightly greater than the track width.

After completion of the second DC erase operation, a measurement of the residual signal 500A is carried out at, for example, +/−1.8 tracks away from track 101. The measurement locations are denoted by reference numerals 502 and 504 in FIG. 5C. Thus, since track 101 is track 0, the residual signal 500A measurement may be carried out at about 2 tracks away from track 0 on both sides of track 0 in some embodiments. In general, the measurement may be carried out at any suitable location that enables reading of the residual signal 500A. The reading of the residual signal 508A may be carried out by a read head that is operably coupled to the controller. A signal ratio (e.g., a signal amplitude measured on a first side of track 0 at a distance of about 2 tracks away from track 0 divided by a signal amplitude measured on a second side of track 0 at the distance of about 2 tracks away from track 0) may be calculated. When no reversed side shield condition is present in the write head, the signal ratio may have a value between about 0.1 to about 1.5. When there is a reversed side shield condition in the write head, the signal ratio value may be between about 5 to about 50.

Figure 6A:
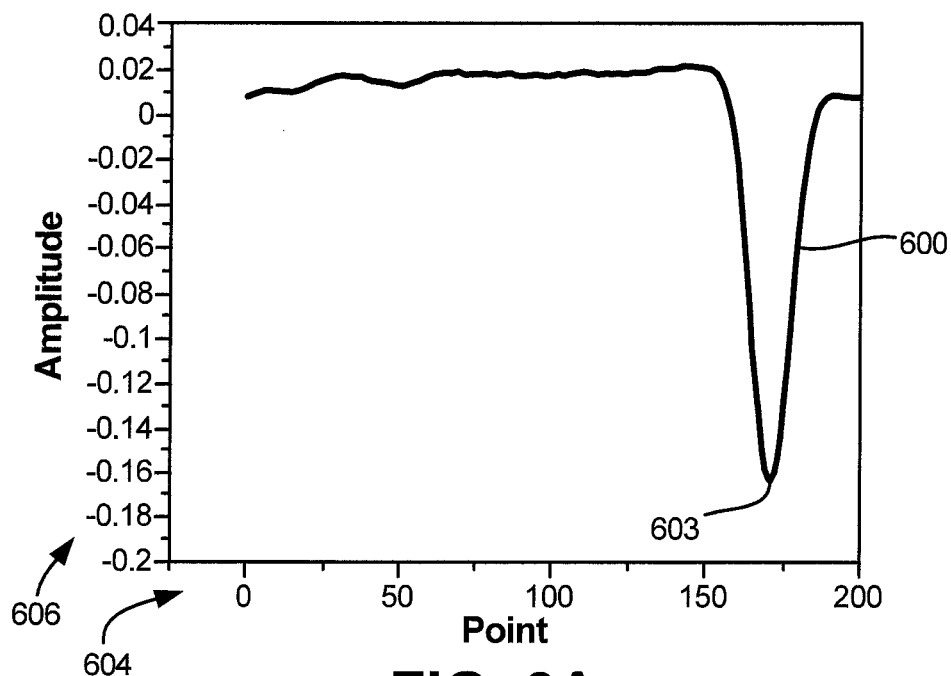
FIGS. 6A and 6B illustrate time domain plots of residual signal measurements for a write head under a riverside shield condition.
Figure 6B:
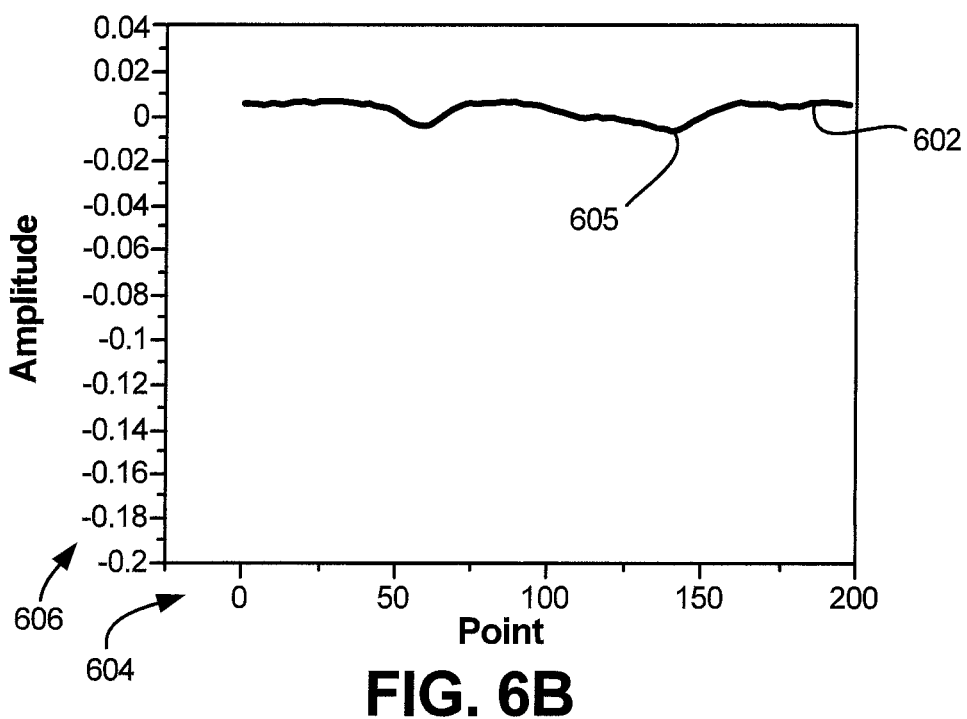

FIGS. 6A and 6B illustrate plots of residual signal measurements on sides of tracks 0 for a write head under a riverside shield condition. It should be noted that the residual signal measurement values used to obtain the plots of FIGS. 6A and 6B are determined by carrying out signal processing operations on the read signal. FIG. 6A shows a plot 600 of the measurement of the residual signal on a first side of track 0, and FIG. 6B shows a plot 602 of the measurement of the residual signal on a second side of track 0. In FIGS. 6A and 6B, horizontal axis 604 represents points and vertical axis 606 represents signal amplitude. The signal ratio (e.g., the maximum amplitude point (e.g., point 603) on plot 600 divided by the maximum amplitude point (e.g., point 605) on plot 602) is then calculated. For the example of FIGS. 6A and 6B, the signal ratio or amplitude ratio is equal to 15 (0.15 at point 603 divided by 0.01 at point 605). It should be noted that absolute values are used for determining the maximum amplitude points for the signal ratio calculation (e.g., the sign of the amplitude point is disregarded).

Figure 7A:
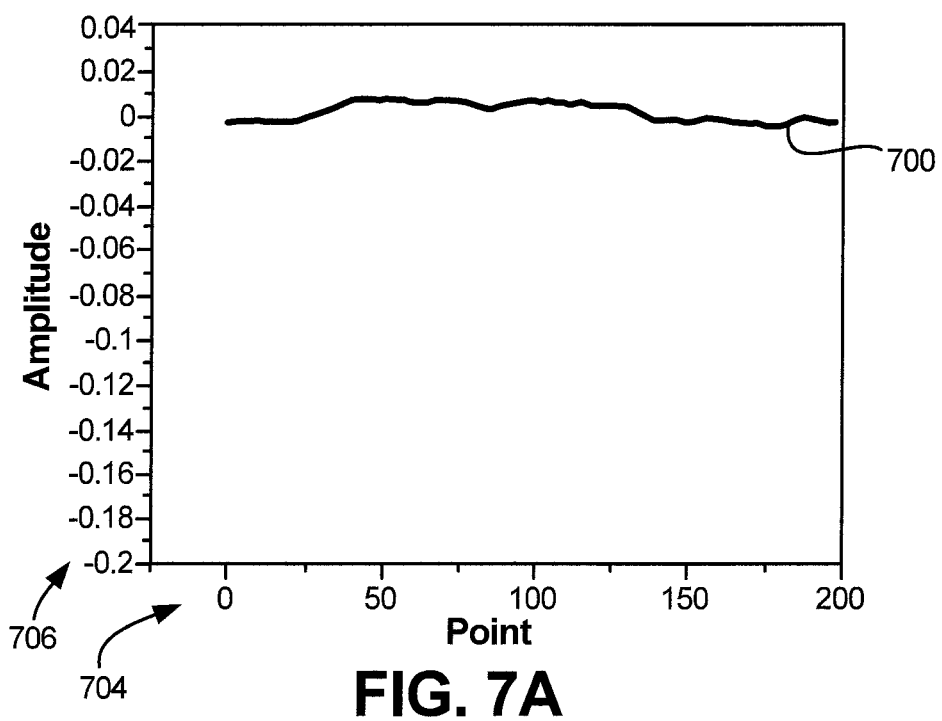
FIGS. 7A and 7B illustrate time domain plots of residual signal measurements for a write head without a riverside shield condition.
Figure 7B:
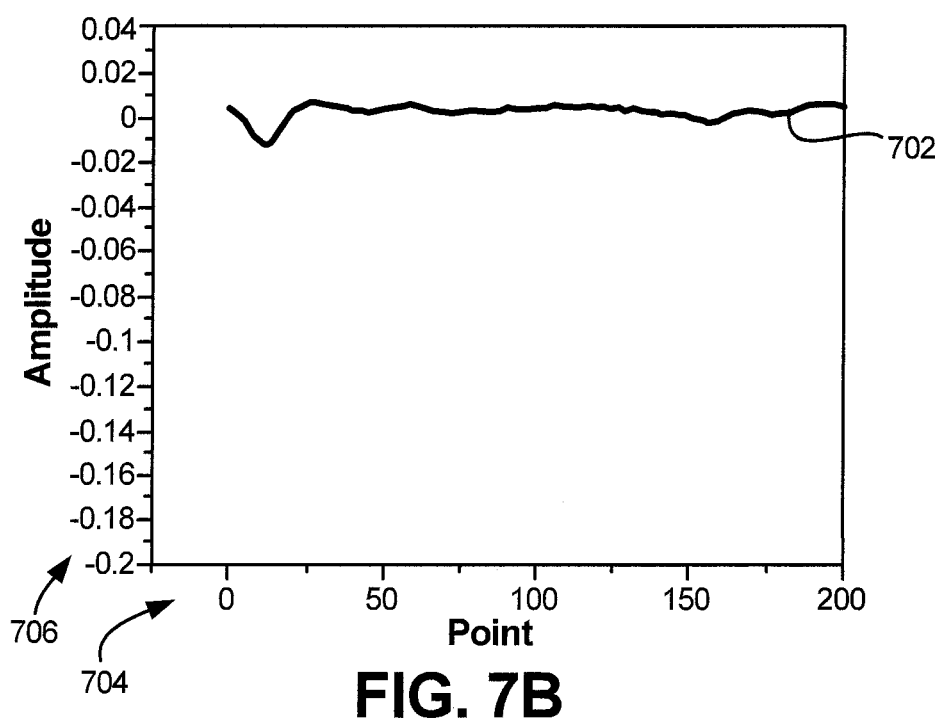

FIGS. 7A and 7B illustrate plots of residual signal measurements on sides of tracks 0 for a write head without a riverside shield condition. The vertical and horizontal axes are the same as those in FIGS. 6A and 6B. Further, plots 700 and 702 are for signal measurements on first and second sides of track 0, respectively, at similar locations as those used for measurements carried out in connection with FIGS. 6A and 6B. For the example of FIGS. 7A and 7B, the signal ratio or amplitude ratio is equal to 0.9.

Instead of carrying out the signal ratio measurement technique described above in connection with FIGS. 6A-7B, a narrow band filter may be used to measure amplitudes of the residual signals. The signal amplitude values obtained using the narrow band filter may then be used to calculate the signal or amplitude ratio.

Figure 8:
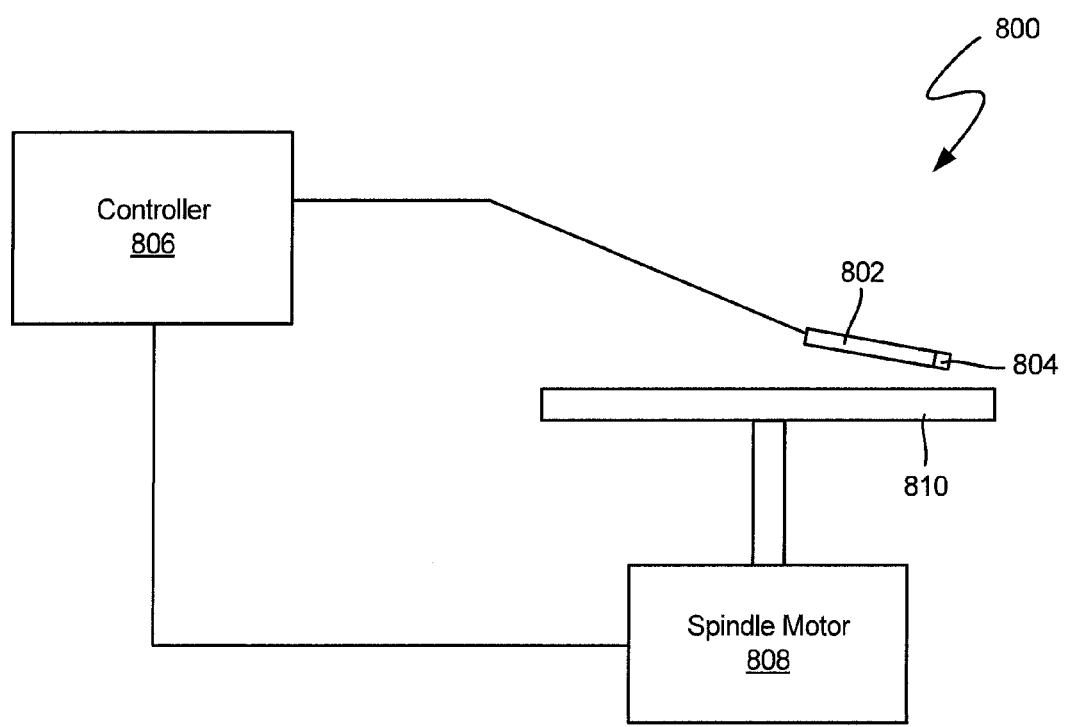
FIG. 8 is a block diagram of an apparatus configured for measuring a reversed side shield condition in a write head in accordance with various embodiments.

FIG. 8 is a block diagram of an apparatus configured for measuring a reversed side shield condition in a write head in accordance with various embodiments. The apparatus 800 shown in FIG. 8 can be implemented in a spin stand tester, for example. A slider 802 having a write head 804 that includes a write pole (not shown in FIG. 8) and side shields (not shown in FIG. 8) may be releasably coupled within apparatus 800 for testing purposes. A controller 806 is coupled to the slider 802 and to a spindle motor 808, which rotates a data storage disc 810. Controller 804, which may include a processor having integrated circuits and a memory, is configured to coordinate measuring of a reversed side shield condition in the slider 802 in accordance with embodiments described in connection with FIGS. 4 and 5A-5C. Once a reversed side shield-related measurement is carried out for sliders 802, a different slider may be mounted in apparatus 800 and a reversed side shield condition test may be carried out on that slider. A test time for each slider is about 1.5 seconds, which is a fraction of the time that it would take to carry out a reversed side shield condition measurement using MFM and footprint tests. A footprint test may involve carrying out thousands of write operations with a particular write head before determining whether that head is under a reversed side shield condition. Such a footprint test on a single head may take about 30 minutes. The test time is only 1.5 seconds for the present embodiments because a single operation is used to write the single frequency magnetization pattern.

A comparison of reversed side shield condition measurements using embodiments of the disclosure and reversed side shield condition measurements using MFM and footprint tests shows that the reversed side shield condition measurements in accordance with the above-described embodiments have an accuracy of about 97%. This demonstrates that the above-described embodiments are suitable for head-level reversed side shield screening for production of disc drives.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   supplying, by a controller, a predetermined signal to a write head having side shields;
   when the predetermined signal is supplied to the write head, performing, by the write head, a recording operation on a surface of a data storage medium to provide a recorded magnetization pattern;
   carrying out measurements on a portion of the recorded magnetization pattern influenced by a magnetization of the side shields; and
   determining whether a reversed side shield magnetization condition is present in the write head from the measurements.

2. The method of claim 1 and wherein the predetermined signal is a single-frequency alternating current signal.

3. The method of claim 1 and further comprising performing a first direct current (DC) erase operation on the surface of the data storage medium prior to performing the recording operation on the surface of the data storage medium.

4. The method of claim 3 and further comprising performing a second DC erase operation to erase portions of the recorded magnetization pattern not substantially influenced by the magnetization of the side shields before carrying out the measurements on the portion of the recorded magnetization pattern influenced by the magnetization of the side shields.

5. The method of claim 4 and wherein the recording operation on the surface of the data storage medium is carried out on a single track of the data storage medium.

6. The method of claim 5 and wherein the DC erase operation is carried out on the single track, and wherein the DC erase operation covers a width that is about 1.4 to about 1.6 times a width of the single track.

7. The method of claim 5 and wherein the measurements on the portion of the recorded magnetization pattern influenced by the magnetization of the side shields is carried out at a track distance of about 2 tracks away from the single track on which the magnetization pattern is recorded.

8. The method of claim 7 and wherein the measurements comprise a first measurement on a first side of the single track on which the magnetization pattern is recorded and a second measurement on a second side of the single track on which the magnetization pattern is recorded.

9. The method of claim 8 and further comprising computing a ratio of the first measurement to the second measurement.

10. The method of claim 9 and further comprising determining that the reversed side shield magnetization condition is present in the write head if the computed ratio is above a predetermined value.

11. A data storage device comprising:
a data storage medium;
a write head having side shields;
a controller operably coupled to the data storage medium and the write head, the controller is configured to:
direct the write head to record a test magnetization pattern on the data storage medium;
carry out measurements on a portion of the recorded test magnetization pattern influenced by a magnetization of the side shields; and
determine whether a reversed side shield magnetization condition is present in the write head from the measurements.

12. The data storage device of claim 11 and wherein the controller is further configured to supply the write head with a predetermined signal when the write head records the test magnetization pattern on the data storage medium.

13. The data storage device of claim 12 and wherein the predetermined signal is a single-frequency alternating current signal.

14. The data storage device of claim 12 and wherein the data storage device comprises a hard disc drive.

15. The data storage device of claim 12 and wherein the data storage device comprises a test device configured to test a plurality of write heads.

16. A method comprising:
writing, by a write head having side shields, a test magnetization pattern on a data storage medium;
carrying out measurements on a portion of the test magnetization pattern influenced by a magnetization of the side shields; and
determining whether a reversed side shield magnetization condition is present in the write head from the measurements.

17. The method of claim 16 and further comprising supplying the write head with a predetermined signal when the write head records the test magnetization pattern on the data storage medium.

18. The method of claim 16 and wherein the predetermined signal is a single-frequency alternating current signal.

19. The method of claim 16 and further comprising performing a first direct current (DC) erase operation on the data storage medium prior to writing the test magnetization pattern on the data storage medium.

20. The method of claim 19 and further comprising performing a second DC erase operation to erase on portions of the test magnetization pattern not substantially influenced by the magnetization of the side shields before carrying out the measurements on the portion of the test magnetization pattern influenced by the magnetization of the side shields.

* * * * *